United States Patent
Petrocelli et al.

(10) Patent No.: US 6,245,851 B1
(45) Date of Patent: Jun. 12, 2001

(54) VINYL ACETATE/ETHYLENE HIGH SOLIDS EMULSIONS

(75) Inventors: Francis Peter Petrocelli, Blandon; Cajetan Francis Cordeiro, Kutztown, both of PA (US)

(73) Assignee: Air Products Polymers, L.P., Allentown, PA (US)

( * ) Notice: Subject to any disclaimer, the term of this patent is extended or adjusted under 35 U.S.C. 154(b) by 0 days.

(21) Appl. No.: 09/348,222

(22) Filed: Jul. 6, 1999

(51) Int. Cl.[7] .............................. C08F 2/24; C08F 218/08
(52) U.S. Cl. ........................ 524/459; 524/563; 526/65; 526/67; 526/73; 526/202; 526/331
(58) Field of Search .................... 524/459, 563; 526/67, 65, 202, 73, 331

(56) References Cited

U.S. PATENT DOCUMENTS

| | | | |
|---|---|---|---|
| 2,587,562 | 2/1952 | Wilson | 260/89.1 |
| 3,551,396 | 12/1970 | Lanthier et al. | 260/85.7 |
| 4,035,329 | 7/1977 | Wiest et al. | 260/29.6 T |
| 4,164,489 | * 8/1979 | Daniels et al. | 260/29.6 R |
| 4,921,898 | 5/1990 | Lenney | 524/459 |
| 5,070,134 | 12/1991 | Oyamada et al. | 524/503 |
| 5,124,394 | 6/1992 | Lenney | 524/459 |
| 5,442,006 | 8/1995 | Aydin et al. | 524/457 |
| 5,629,370 | 5/1997 | Freidzon | 524/503 |

* cited by examiner

*Primary Examiner*—David W. Wu
*Assistant Examiner*—Kelechi Egwim
(74) *Attorney, Agent, or Firm*—Russell L. Brewer

(57) ABSTRACT

A continuous emulsion polymerization process consisting of multiple stirred-tanks in series is used to produce a broad particle-size distribution for vinyl acetate-based emulsions utilizing polyvinyl alcohol as a protective colloid. When low-molecular-weight grades of PVOH and a continuous process are employed, a high-solids emulsion can be produced. This process eliminates the need for a co-surfactant, which is required to make similar high-solids emulsions via a batch process.

8 Claims, 1 Drawing Sheet

CONTINUOUS REACTOR SYSTEM FOR PRODUCING VINYL ACETATE/ETHYLENE EMULSIONS

VINYL ACETATE/ETHYLENE HIGH SOLIDS EMULSIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Vinyl acetate/ethylene (VAE) emulsions have been widely produced for use as adhesives, coatings, paints, and other applications. One of the recent trends in vinyl acetate/ethylene polymer emulsion technology is to increase the solids content to a level above about 65% by weight, preferably to a level of at least from 65 to 75% by weight. Customary commercial vinyl acetate/ethylene emulsions typically have a solids content of from 54–56%. The former emulsions are referred to as "high solids" emulsions and offer many advantages in addition to the fact there is more product per unit weight. Representative patents for producing batch high solids vinyl acetate/ethylene emulsions are as follows:

U.S. Pat. No. 4,921,898 discloses a process for producing vinyl acetate/ethylene copolymer emulsions having from about 65–70% solids which emulsion is prepared in the presence of a stabilizing system consisting essentially of 2–4 wt % polyvinyl alcohol having a degree of polymerization of from 100 to 600 and from about 2–4 wt % of a surfactant such as condensates of ethylene oxide and a hydrophobic base and alkylphenoxy poly(ethyleneoxy) ethanol, the surfactants being sold under the trademarks Pluronic and Igepal, respectively.

U.S. Pat. No. 5,124,394 discloses a process for producing high solids vinyl acetate/ethylene copolymers utilizing a stabilizing system consisting essentially of poly(ethyloxazoline). Optionally, a low molecular weight polyvinyl alcohol having a molar percent hydrolysis of from 75–99% and an average degree of polymerization from 100 to 600 is included as a component of the stabilizing system. Also, one can incorporate small levels of alkylphenoxy poly(ethyleneoxy) ethanols and ethylene oxides of hydrophobic bases.

U.S. Pat. No. 5,070,134 discloses a process for producing high solids vinyl acetate/ethylene emulsions having a solids content of from 65–70% by weight utilizing an emulsifying dispersant containing from 1 to 1.9 parts by weight partially saponified polyvinyl alcohol having an average polymerization degree of from 300 to 1,000 and from 1 to 3 parts by weight of a polyoxyethylene nonionic surface active agent having an HLB of from 16.5 to 17.5 per hundred parts by weight of vinyl acetate units.

U.S. Pat. No. 5,629,370 discloses a process for producing vinyl acetate/ethylene copolymers having a solids content of at least 65% by weight utilizing from 0.8 to 2 percent by weight of a fully or partially hydrolyzed polyvinyl alcohol in a mixture of nonionic, ethoxylated alkylphenol surfactants having an HLB of from 16.0 to 16.5.

Vinyl acetate/ethylene emulsions have also been prepared by continuous processes, but largely the continuous processes have been used for the production of polyvinyl acetate homopolymers and vinyl acetate/ethylene emulsions at conventional, 54–56% solid levels. Representative patents are as follows:

U.S. Pat. No. 4,164,489 discloses a continuous process for producing vinyl acetate/ethylene copolymer emulsions for use in adhesive applications. The solids content of the emulsions range from about 40–65% with a general range of between 50 and 60% solids. The stabilizer used for the polymerization consisted of polyvinyl alcohol typically having a molar hydrolysis of 87–89% and a viscosity of 21–25 cps at 4% solids at ~20° C. Initial polymerization of vinyl acetate and ethylene is carried out in the presence of a seed latex and then removing the latex from the initial polymerization vessel at a vinyl acetate monomer content of from 5–20% by weight.

U.S. Pat. No. 2,587,562 discloses a process for continuous polymerization of vinyl acetate utilizing a stabilizing system of hydroxyethyl cellulose and sodium sulfonate.

U.S. Pat. No. 3,551,396 discloses a process for producing a variety of vinyl polymers by polymerizing such vinyl monomers in a "loop" reactor. The stabilizing system employed in the loop reactor is a polyoxyethylene-polyoxypropylene copolymer.

U.S. Pat. No. 4,035,329 discloses a process for the continuous production of an ethylene/vinyl acetate copolymer in the presence of a redox catalyst system in which the oxidizing component of the redox catalyst system is in molar excess of from 3 to 10 times the presence of the reducing agent, and the monomers are added at a rate such that the unreacted vinyl monomer concentration does not exceed 15% by weight.

U.S. Pat. No. 5,442,006 discloses a process for producing vinyl acetate and acrylic dispersions having wide particle size range. A wide variety of surface active substances containing polymer are suited for stabilizing the emulsion, and these include polyvinyl alcohol, cellulose derivatives, and vinyl pyrrolidone containing copolymers as well as other nonionic, cationic, and anionic emulsifiers.

BRIEF SUMMARY OF THE INVENTION

The basic process for producing high solids vinyl acetate/ethylene emulsions comprised polymerizing vinyl acetate and ethylene, optionally including other ethylenically unsaturated monomers, in a reaction vessel in the presence of a stabilizing system. On conclusion of the polymerization the unreacted monomers are removed and product recovered. The improvement for producing a high solids vinyl acetate/ethylene aqueous emulsion comprises:

effecting polymerization in at least two backmixed reaction vessels comprised of a primary and secondary reaction vessel wherein the reactants and products are continuously and sequentially introduced and removed respectively; and effecting polymerization in the presence of a stabilizing system consisting essentially of a low molecular weight polyvinyl alcohol having a molar hydrolysis value of from 87 to 99%.

There are significant advantages of the improved process, and these include:

an ability to eliminate conventional surfactants from the emulsion polymerization process and thus improve the potential to increase the water resistance of the vinyl acetate/ethylene polymer in its end-use applications;

an ability to remove surfactant from the polymerization process thus permitting one to improve vinyl acetate/ethylene polymer product consistency, as it is no longer necessary to carefully control the relative concentrations of two different stabilizers and their addition rate in the polymerization process;

an ability to produce low viscosity vinyl acetate/ethylene emulsions having a viscosity of <3000 cps a @ 65% solids, typically from 1000 to 3000 cps; and, an ability to produce quality vinyl acetate/ethylene emulsions at high solids.

BRIEF DESCRIPTION OF SEVERAL VIEWS OF THE DRAWINGS

The drawing is a process flow diagram of a continuous process for producing high solids vinyl acetate/ethylene emulsions.

DETAILED DESCRIPTION OF THE INVENTION

Figure 1:
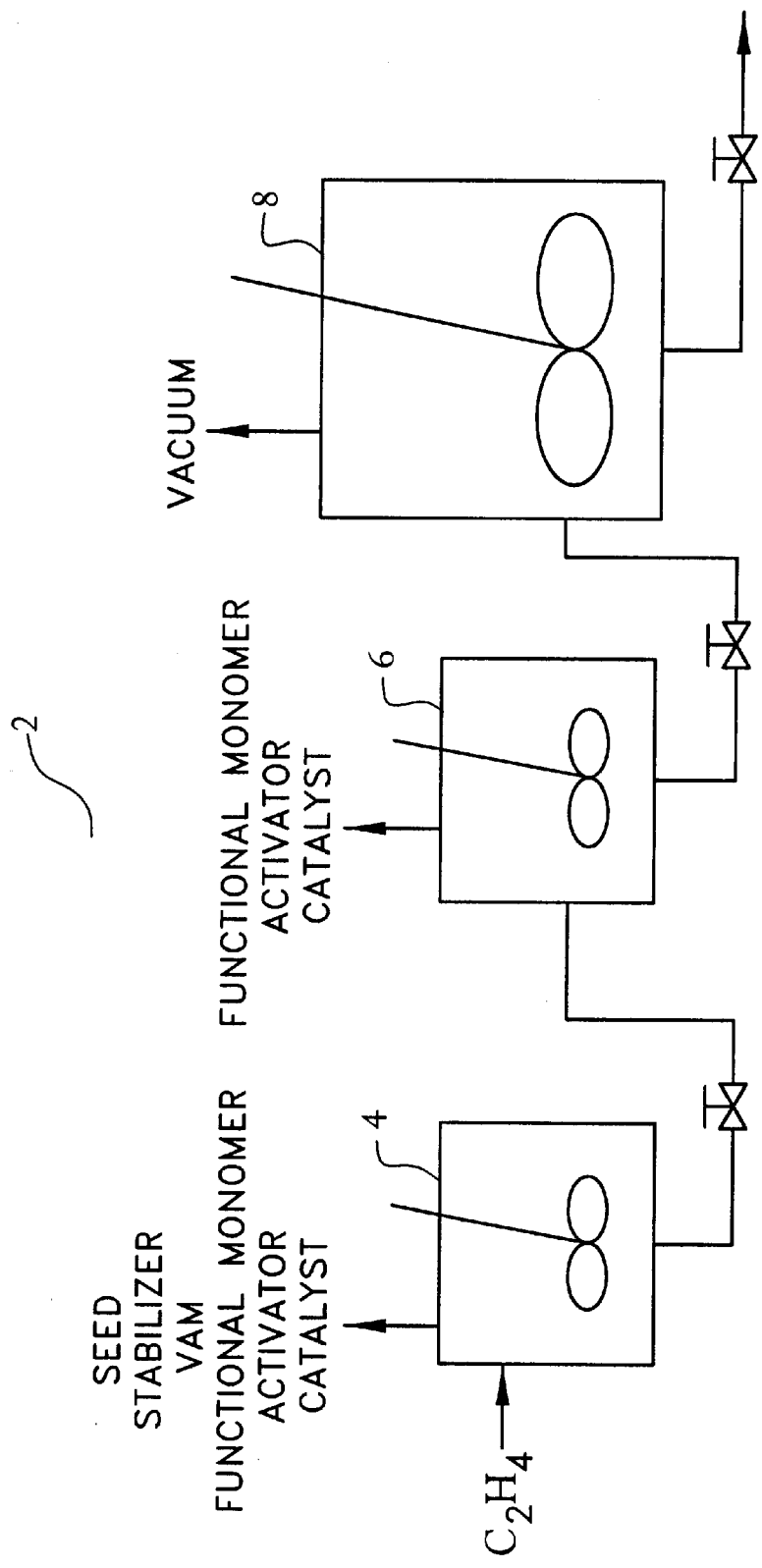

Emulsion polymerization of high solids vinyl acetate/ethylene based emulsions has generally been effected in a batch reactor in an aqueous medium under ethylene pressures not exceeding 100 atmospheres (generally from 40 to 80 atmospheres) in the presence of a catalyst and at least one emulsifying agent. In the past, the emulsifying agent comprised polyvinyl alcohol and a surfactant. The presence of polyvinyl alcohol complicates the process because conventional batch processes have not been adapted to make high solids vinyl acetate/ethylene emulsions without surfactant.

The high solids vinyl acetate/ethylene copolymers produced by the process herein contain from about 65 to 95% by weight of vinyl acetate, 5 to 35% by weight of ethylene and 0 to 15% by weight of ethylenically unsaturated monomer. The sum of the percentages of the monomers employed to form the copolymer is always 100. Preferred ranges are 15–25% by weight for ethylene and 75–85% by weight for vinyl acetate and less than 5% optional monomer.

A variety of ethylenically unsaturated monomers can be copolymerized with the vinyl acetate and ethylene to form the high solids VAE emulsions. For example, $C_{1-8}$ alkyl vinyl ethers, $C_{1-8}$ esters and amides of acrylic acid and methacrylic acid and unsaturated carboxylic acids can be copolymerized with the vinyl acetate and ethylene to produce a variety of polymeric vehicles. Examples of useful alkyl vinyl ethers are methyl vinyl ether, ethyl vinyl ether, isopropyl vinyl ether, n-propyl vinyl ether, tert-butyl vinyl ether and n- and isobutyl vinyl ether. Examples of $C_{1-8}$ alkyl esters of acrylic acid and methacrylic acid include methyl methacrylate, butyl acrylate, ethyl acrylate, and 2-ethylhexyl acrylate. Examples of other monomers include acrylamide, methacrylamide, N-vinylformamide, N-methylol acrylamide, etc., and unsaturated acids include acrylic, methacrylic, and crotonic acid. Esters of dicarboxylic acids such as esters of maleic fumaric, itaconic acids, etc. and $C_{4-12}$ alkanols also may be polymerized with the vinyl acetate and ethylene monomers. Examples of such diester include dioctyl and dibutyl maleate, etc. Generally less than 15% by weight of the vinyl acetate/ethylene polymeric resin particles are comprised of a monomer other than vinyl acetate and ethylene and preferably less than 5% of the polymeric resin particle is comprised of an optional comonomer.

The stabilizing system employed in the continuous process, and in contrast to conventional stabilizing systems employed for high solids vinyl acetate/ethylene emulsions, typically consists of 0.5–8 wt %, preferably 2–5 wt %, of polyvinyl alcohol based upon the weight of vinyl acetate monomer. Essentially no surfactant is employed in the stabilizing system for effecting polymerization. Prior art systems required the presence of surfactant, but such surfactant components effect water resistance. The polyvinyl alcohol that is used in the stabilizing system can be 75–99+ mole % hydrolyzed, preferably from about 87–89 mole % hydrolyzed, and has a degree of polymerization ranging from 50 to 3000; preferably, 100 to 1500; and most preferably, 200 to 1000. The degree of polymerization of the polyvinyl alcohol affects the viscosity of the emulsion product; i.e., as degree of polymerization increases, viscosity of the emulsion product increases.

The free radical initiating catalyst used to effect polymerization is commonly referred to as a redox catalyst. The redox catalysts, as is known, comprise an oxidizing agent (initiator) and reducing agent (activator). The oxidizing and reducing components can be any of those conventionally used in vinyl acetate emulsion polymerization. Examples of preferred oxidizing components are hydrogen peroxide, potassium persulfate, t-butyl peroxypivalate, t-butyl hydroperoxide, etc. and preferred reducing agents include sodium formaldehyde sulfoxylate, ferrous ammonium sulfate and ascorbic or its isomer, erythorbic acid.

The initiator is employed in the amount of 0.1 to 2%, preferably 0.25 to 0.75%, based on the weight of vinyl acetate introduced into the system. The activator is ordinarily added as an aqueous solution and the amount of activator is generally from 0.5 to 3 times the amount of initiator.

The emulsion process employed herein to generate high solids, vinyl acetate/ethylene emulsions without substantial levels of surfactant, is a continuous process and carried out in at least two reaction vessels in series. Specifically, the process flow system is comprised of a primary reaction vessel and a secondary reaction vessel and an unreacted monomer removal unit. More than two, e.g., up to four reaction vessels may be used in the process and the number is a design consideration. Initial polymerization is effected in the primary vessel and final polymerization is essentially completed in the secondary vessel. When polymerization is essentially complete in the secondary vessel, the reaction product is transferred to a stripper (degasser) and unreacted vinyl acetate and ethylene removed. As in conventional processes, product from the degasser is sent to storage or sometimes partially concentrated and then sent to product storage.

To aid in controlling the stability of the vinyl acetate/ethylene emulsion, a seed polymer emulsion is employed. In contrast to polyvinyl acetate production, for example, seed polymer emulsion is introduced as one of the feed components, generally along with the stabilizer and is not formed in this process. This "seed" emulsion is typically a small particle size vinyl acetate or vinyl acetate/ethylene emulsion that has been prepared separately. Generally, the seed emulsion will have a solids concentration of from 50 to 60% by weight and is introduced to the primary reactor at a level of less than 5% by weight of the product polymer to be formed in the process. Typical ranges for seed emulsions are from 2 to 4% by weight of the final emulsion weight or alternatively from 2 to 5% by weight of the vinyl acetate to be polymerized, i.e., based upon seed polymer solids/vinyl acetate monomer. Due to the backmixing in the reaction vessels, a wide particle size diameter range (i.e., a broad particle-size distribution) is created, facilitating the achievement of high-solids latex products. A Dw/Dn ratio of from 2.5 to 5 is acceptable.

The primary reactor is maintained at a pressure of 500–1000 psig with a continuous feed of ethylene; vinyl acetate is also continuously charged to the reactor. A catalyst system comprising the oxidizing agent and reducing agent is added to maintain a preselected reaction rate. The reaction product of the primary vessel is removed and introduced continuously to the secondary vessel for final polymerization. The unreacted vinyl acetate level is maintained within a range of 10 to 50% by weight of the emulsion in the primary vessel and 0.5 to 10% by weight of the emulsion in the secondary vessel.

Reaction temperatures for emulsion polymerizing the vinyl acetate and comonomers are conventional. The reaction temperature can be controlled by the rate of catalyst addition and by the rate of the heat dissipation therefrom. Generally, it is advantageous to maintain a temperature from about 50° to 80° C. and to avoid temperatures in excess of 90° C. While temperatures as low as 0° can be used, economically, the lower temperature limit is about 40° C.

The reaction time will also vary depending upon other variables such as the temperature, the catalyst, and the desired extent of the polymerization. It is generally desirable to continue the reaction through the secondary reaction vessel until less than 5% of the vinyl acetate remains unreacted. Under these circumstances, a reaction time of about 6 hours has been found to be generally sufficient for complete polymerization, but reaction times ranging from 3 to 10 hours have been used, and other reaction times can be employed, if desired. Typically, reaction times were 2 to 4 hours in the primary vessel and 0.5 to 4 hours in the secondary vessel. Thus, total primary and secondary reaction times were 3 to 8 hours.

In effecting polymerization of the monomers to form the latex, water, seed emulsion, vinyl acetate (optionally a small level of optional comonomers), ethylene, polyvinyl alcohol, and redox components are continuously charged to the primary reactor in conventional amount. Typically, from about 50 to 90% by weight of the vinyl acetate and optional monomers to be polymerized are continuously polymerized in the primary reaction vessel. The remainder of the vinyl acetate, ethylene and any optional monomers are continuously polymerized in the secondary vessel. To effect polymerization, the monomers, oxidizing agent, the reducing agent, polyvinyl alcohol, and seed polymer emulsion are added to the primary vessel at a rate such that the unreacted vinyl acetate in the primary vessel is maintained within a range from about 10 to 50%, generally from 15 to 40%, by weight of the emulsion. The reaction product from the primary vessel is continuously removed and then continuously charged to the secondary vessel where polymerization is essentially completed. The unreacted vinyl acetate level in the secondary vessel will range from less than 10% and generally <5% by weight of the emulsion. The reaction product from the secondary vessel is continuously charged to the degasser vessel, where the residual vinyl acetate then is reduced generally to less than about 0.5% by addition of additional oxidizing agent and reducing agent. Residual ethylene is removed in the degasser by applying vacuum.

The aqueous system is maintained within a preselected pH range, typically within a pH of from about 4 to 6 by a suitable buffering agent. The finished emulsion product is continuously removed from the degasser and transferred to storage. At the end of the polymerization, the pH may be adjusted to about 5.5, usually with ammonium hydroxide.

The particle size of the polymer in the emulsion is believed to have a significant bearing on the ability to generate high solids vinyl acetate/ethylene emulsions. A broad particle size is generated by the continuous process and provides for reduced viscosity compared to batch process. It has been found that a ratio of $D_w/D_n$ greater than 2.5 preferably greater than 3 is desired.

Agitation is a variable which can effect particle size in the polymer emulsion. Agitation should be vigorous enough so that appropriate heat transfer can be achieved but mild enough so product stability is maintained.

The following examples are provided to illustrate preferred embodiments of the invention and are not intended to restrict the scope thereof. All percentages are expressed as weight percentages, and all temperatures are in degrees centigrade.

EXAMPLE 1

General Procedure

To facilitate an understanding of the process, reference is made to the drawing. Specifically, the polymerization system 2 was comprised of a primary reaction vessel 4, a secondary vessel 6 and a finishing stripper 8 (degasser).

All polymers were prepared in the polymerization consisting of a primary vessel 4 (3 gallons), a secondary vessel 6 (1 gallon), and a finishing stripper 8 (5 gallons) capable of withstanding pressures up to about 1200 psig. Each reactor was equipped with a jacket for cooling, a mechanical agitator with multiple impeller blades, and metering pumps for continuous addition of the various feeds. The terms primary and secondary reactors have been used for convenience in describing the polymerization procedure and often referenced to the drawing. Deionized water was used for all polymerization.

To start the polymerization, primary reactor vessel 4 was filled with a "heel" of a polyvinyl alcohol stabilized vinyl acetate/ethylene emulsion to a level of about 50 to 80% of its volume (usually emulsion product from a previous continuous run). The secondary reactor vessel and degasser vessel were empty. The primary reactor was pressurized to a pressure of 500 to 1000 psig with ethylene. Agitation was commenced. Simultaneously, a blend of polyvinyl alcohol consisting of 60% Airvol 203 and 40% Airvol 107 poly (vinyl alcohol) was continuously introduced to the primary reactor along with continuous feeds of polyvinyl acetate seed polymer, redox initiating system, and all monomers, including both vinyl acetate and ethylene. The poly(vinyl alcohol) blend was added to maintain a stabilizer level of approximately 5% by weight based upon vinyl acetate introduced to the primary reactor. A redox catalyst consisting of hydrogen peroxide as the oxidizing agent and sodium formaldehyde sulfoxylate as the reducing agent was used. The addition of all feeds was continuous.

Polymerization was conducted in primary reactor 4 at a rate to maintain an unreacted vinyl acetate content of about 25 to 45% by weight of the emulsion. Once the primary reactor 4 was filled, the vinyl acetate/ethylene emulsion was removed continuously from the primary reactor vessel and charged to the secondary reactor vessel 6 wherein the final polymerization of the vinyl acetate was effected. The rate of removal of vinyl acetate/ethylene emulsion from the primary vessel was equal to the rate of the addition of the reactants thereto and equal to the rate of introduction to secondary vessel 6.

Additional redox was continuously introduced to the secondary reactor to maintain an unreacted vinyl acetate level of from 2 to 10%. No ethylene was charged to the secondary reactor vessel. However a pressure of from about 200 to 400 psig was maintained.

On substantial completion of polymerization in the secondary reactor, the contents of the secondary vessel were continuously transported to degasser 8 operating under a vacuum of 50 to 500 mm Hg where ethylene, dissolved gases and unreacted vinyl acetate were removed from the emulsion. The finished emulsion then was removed from the degasser 8 for storage and subsequent use.

The emulsion exiting the degasser was analyzed for solids content, viscosity based on a Brookfield viscometer No. 2 spindle at 60 rpm at a temperature of ~25° C. The particle size diameter of the emulsion was measured using a Joyce Loebl instrument. Plots of the particle size data were plotted and the results reported in Table 1.

The resultant emulsion after removal from the degasser had a viscosity of 505 cps @ 64.1% solids). The ratio of weight-average particle size diameter to number-average particle size diameter ($D_w/D_n$) was 3.8.

TABLE 1

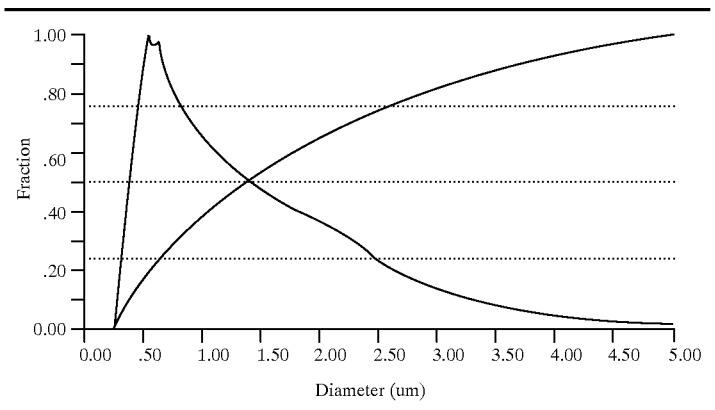

Airvol 107—is a polyvinyl alcohol having a mole % hydrolysis from 98.0–98.8 and a viscosity of 5.5–6.5 (measured as a 4% solution at 20° C.).

Airvol 203—is a polyvinyl alcohol having a mole % hydrolysis from 87.0–89.0 and a viscosity of 5.2–6.2 (measured as a 4% solution at 20° C.).

EXAMPLE 2

Concentration of Emulsion Solids

In this example, the solids of Example 1 were concentrated by removing water through heating. The emulsion of Example 1 was heated to a temperature of 50 to 60° C. under a pressure of 30 to 50 mm Hg. The resultant emulsion had a viscosity of 1985 cps @ 69.2% solids.

EXAMPLE 3

Preparation of High solids VAE

The procedure of Example 1 was repeated except the pH of the poly(vinyl alcohol) feed was lowered from 5.7 to 4.8 through addition of phosphoric acid. The results are as follows: The resultant emulsion after removal from the degasser had a viscosity of 690 cps @ 65.5% solids. Plots of the particle size data were plotted and the results reported in Table 2.

The ratio of weight-average to number-average particle size diameter ($D_w/D_n$) was 4.5.

TABLE 2

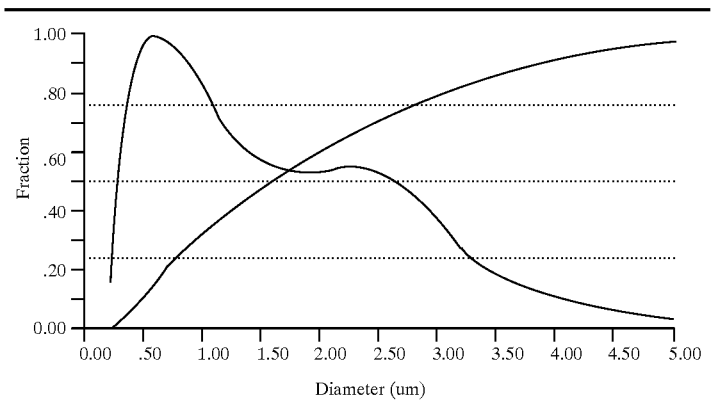

EXAMPLE 4—COMPARATIVE

VAE Emulsions With Low and Medium Molecular Weight Poly(vinyl alcohol)

The procedure of Example 1 was repeated with the exception that the stabilizing blend was changed to a 75/25 blend of Airvol 205 and Airvol 523 poly(vinyl alcohol). Plots of the particle size data were plotted and the results reported in Table 3.

TABLE 3

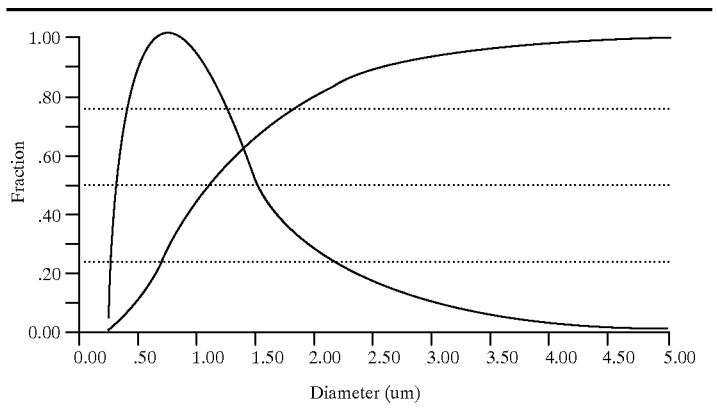

Airvol 205—is a polyvinyl alcohol having a mole % hydrolysis from 87.0–89.0 and a viscosity of 5.2–6.2 (measured as a 4% solution at 20° C.).

Airvol 523—is a polyvinyl alcohol having a mole % hydrolysis from 87.0–89.0 and a viscosity of 23–27 (measured as a 4% solution at 20° C.).

The resultant emulsion after removal from the degasser had a viscosity of 370 cps @ 54.4% solids, which was similar to the Example 1 viscosity at a solids level of 10% lower than that of Example 1. The ratio of weight-average to number-average particle diameter ($D_w/D_n$) was 2.6.

It is believed the use of a significant level of medium mw PVOH (i.e., Airvol 523), in contrast to the primary use of low molecular weight PVOH in Example 1, prevented the attainment of high solids at low viscosity, despite the broad particle-size distribution obtained through continuous processing. The data also show that the $D_w/D_n$ ratio of 2.6 alone was not sufficient to result in low viscosity, high solids emulsions. (From past experience, if the solids level of the emulsions were increased to a high solids level, the viscosity would be too high to meet target objectives.)

EXAMPLE 5—COMPARATIVE EXAMPLE

Batch Process

A conventional batch process was utilized to produce a VAE copolymer in a 1 gallon reactor followed by a degasser under partial vacuum. The stabilizing system comprised a 65/35 blend of Airvol 205/523 poly(vinyl alcohol) (combination of low- and medium-molecular-weight grades of PVOH). Table 4 shows the particle size distribution.

The resultant emulsion after removal from the degasser had a viscosity of 2500 cps @ 55.3% solids. The ratio of weight-average to number-average particle size diameter ($D_w/D_n$) was 1.7.

TABLE 4

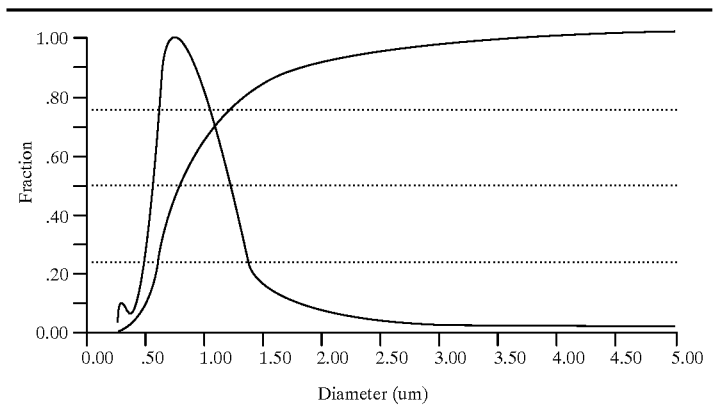

EXAMPLE 6—COMPARATIVE EXAMPLE

Batch Process

The purpose of this run was to determine the effect of continuous production versus batch for the same reactant mix. The polymer reactant composition of Example 1 was repeated with the exception that a conventional batch process operated at 600 psig ethylene was used instead of the continuous process. The stabilizing system comprised the same 60/40 blend of Airvol poly(vinyl alcohols), i.e., Airvol 203 and 107 (all low-molecular-weight grades of PVOH) that was used in Example 1. Table 5 shows the particle size distribution.

The resultant emulsion, after removal from the degasser, had a viscosity of 1320 cps @ 61.8% solids. The emulsion had a higher viscosity at lower solids than Example 1. The ratio of weight-average to number-average particle diameter ($D_w/D_n$) was 1.8.

TABLE 5

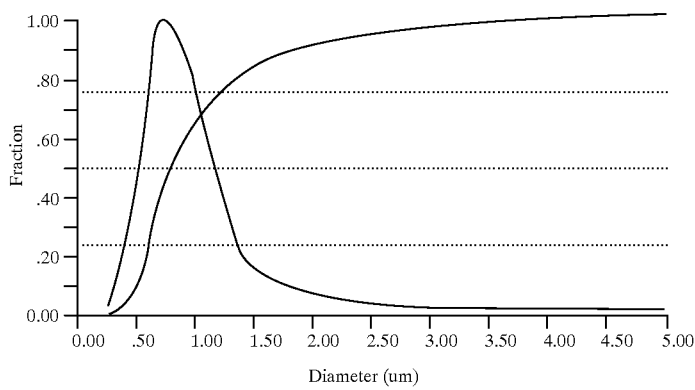

EXAMPLE 7—COMPARATIVE EXAMPLE

The purpose of this example was to increase the solids of Example 6 by removing water through heating as was done similarly in Example 2. The emulsion had a higher viscosity at lower solids than Example 2 (18,850 cps @ 66.6% solids)

EXAMPLE 8

Comparison of Particle Size Distribution

In this example a comparison of the particle size of several emulsions was made to determine if there was a correlation to viscosity and emulsion solids.

Table 6 provides particle size diameter (PSD) data for two batch, commercial vinyl acetate/ethylene products, one produced at a "standard" solids level (Airflex 400— @ 55% solids) and one produced at a "high" solids level (Airflex 7200—@ 72% solids); shown as well is a high-solids vinyl acetate/ethylene emulsion produced by a continuous process such as in Example 1.

TABLE 6

Particle-Size (Disc Centrifuge) Data for Batch and Continuous VAE's

| Product | Stabilizer composition | Stabilizer/ VAM wt ratio | $D_{n1}$ microns | $D_{w1}$ microns | $D_w/D_n$ |
|---|---|---|---|---|---|
| Batch: | | | | | |
| A-400 | PVOH | 0.050 | 0.612 | 0.899 | 1.47 |
| A-400 Ex. 6 | 60% Airvol 203, 40% Airvol 107 | 0.050 | 0.609 | 1.088 | 1.79 |

TABLE 6-continued

Particle-Size (Disc Centrifuge) Data for Batch and Continuous VAE's

| Product | Stabilizer composition | Stabilizer/ VAM wt ratio | $D_{n1}$ microns | $D_{w1}$ microns | $D_w/D_n$ |
|---|---|---|---|---|---|
| A-7200 | PVOH and surfactants | 0.043 | 0.34 | 1.08 | 3.18 |
| Continuous 1 ~ Ex 1 | 60% Airvol 203, 40% Airvol 107 | 0.050 | 0.391 | 1.482 | 3.79 |

VAM refers to vinyl acetate monomer.
A-400 refers to Airflex 400 vinyl acetate/ethylene emulsion stabilized with poly(vinyl alcohol) produced by a batch process.
A-7200 refers to Airflex 7200 vinyl acetate/ethylene emulsion stabilized with poly(vinyl alcohol), and surfactants produced by a batch process.

Characteristic viscosity-solids relationships for all of these emulsions are shown in Table 7. Note that the scale of the y-axis on this graph is logarithmic, and that the viscosities shown vary over three orders of magnitude. Note that the particle size diameter ratios for A-7200 and the continuous sample similar to the formulation of Example 1 are much broader than that for A-400 (i.e., larger ratio of weight-average, $D_w$, to number-average, $D_n$, particle size). Also note that replacing the poly(vinyl alcohol) grades typically used in making A-400 emulsion with all low-molecular-weight poly(vinyl alcohol) grades did not appreciably change the ratio (1.47 vs. 1.79).

TABLE 7

Viscosity-Solids Relationships for Batch and Continuous VAE's

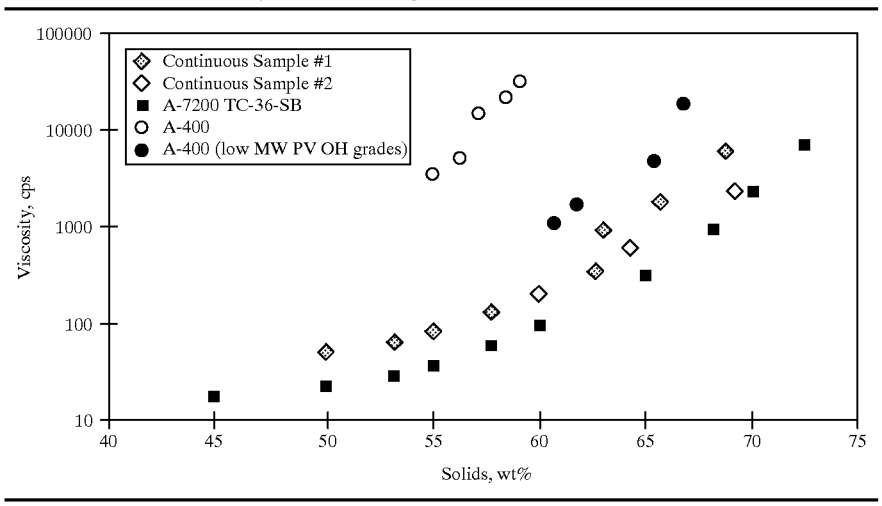

The continuous samples (both Samples 1 and 2 were from the same experimental run) demonstrated behavior similar to A-7200, and achieved much higher solids levels than did A-400 before a dramatic rise in viscosity was observed. Switching to the same low-molecular-weight PVOH grades as were used in the continuous process, to produce A-400, allowed synthesis of a higher-solids emulsion at the same viscosity; however, because its particle size diameter ratio was not sufficiently large, thus indicating a broad particle size range, this product could not attain the solids levels of A-7200 and the continuous samples, i.e., greater that 65% without exhibiting a dramatic viscosity increase.

As shown in Table 7 for the A-400 batch data, switching from high- (i.e., Airvol 540) or medium-molecular-weight (i.e., Airvol 523) grades of PVOH to low-molecular-weight (i.e., Airvol 203 and 107) grades allowed the attainment of higher solids levels before experiencing a dramatic viscosity increase (as would be expected). However, taken as a whole, the data in Table 7 again illustrate that it is the combination of both low-molecular-weight poly(vinyl alcohol) grades as stabilizers and a broad particle size diameter range, i.e., $D_w/D_n>2.5$ preferably >3.5, obtained via a continuous process that is required to produce a high-solids emulsion.

Summary

Although not intending to be bound by theory, it is believed one of the reasons that high solids, polyvinyl alcohol stabilized vinyl acetate/ethylene emulsions can be prepared is because of the wide particle size distribution of the copolymer particles formed in the continuous emulsion process. Even though, it was generally known that continuous emulsion polymerization conducted in one (or several) stirred-tank reactor(s) generally produces a broad particle-size distribution (PSD), it was questionable as to whether that type of process could be adapted to produce a high solids polyvinyl alcohol stabilized emulsion. Vinyl acetate tends to graft to poly(vinyl alcohol) and when poly(vinyl alcohol) is used as the sole stabilizer, there can be a tremendous viscosity increase and thus, the ability to produce high solids emulsions was questionable. The grafting problem had been resolved in prior art batch processes by the use of a substantial amount of surfactant in the emulsions. However, the presence of surfactants tended to interfere with water resistance. The use of a low molecular weight poly(vinyl alcohol) coupled with continuous processing, as described, was able to overcome the inherent viscosity problems associated with high solids VAE emulsions employing polyvinyl alcohol as the sole stabilizer.

What is claimed is:

1. In a process for producing a vinyl acetate/ethylene aqueous based emulsion containing polymerized vinyl acetate/ethylene resin particles, wherein said polymerized resin particles contain from 65% to 95% vinyl acetate by weight, from about 5–35% ethylene by weight and 0 to 10% of a comonomer by weight, the improvement for producing a vinyl acetate/ethylene based emulsion having a solids content of from 65 to 70% by weight and a particle size diameter ratio wherein the weight average particle size diameter $D_w$ to number average particle size diameter $D_n$ is greater than 3 which comprises:

effecting polymerization in at least two backmixed reaction vessels in series comprised of a primary vessel reaction vessel and a secondary reaction vessel wherein the reactants and products are continuously and sequentially introduced and removed respectively;

effecting polymerization in said primary vessel at a pressure of from 500 to 1000 psig while maintaining an unreacted vinyl acetate content of from 25 to 45% by weight;

transferring the contents from the primary vessel to the secondary vessel without venting the ethylene;

effecting polymerization in the secondary vessel at a pressure of from 200 to 400 psig while maintaining an unreacted vinyl acetate content of less than 5% by weight; and, effecting polymerization in the presence of a stabilizing system consisting essentially of low molecular weight poly(vinyl alcohol) having a degree of polymerization of from 200 to 1000 and having a molar hydrolysis value of from 87 to 99%.

2. The process of claim 1 wherein said polymerization is effected in the presence of from 0.5–8 wt % poly(vinyl alcohol) based upon the weight of the vinyl acetate monomer.

3. The process of claim 2 wherein said vinyl acetate/ethylene resin particles have from 15–25% ethylene.

4. The process of claim 2 wherein the polyvinyl alcohol that is used in the stabilizing system is present in an amount from 2–5% of the based upon the weight of vinyl acetate monomer employed in the polymerization.

5. The process of claim 4 wherein the vinyl acetate/ethylene emulsion viscosity is from 1000 to 3000 cps at 25° C.

6. The process of claim 5 wherein the ratio of the weight average particle size (Dw) to number average particle size (Dn) is greater than 3.5.

7. The process of claim 4 wherein the Tg of the resin particles is from −10 to +10° C.

8. The process of claim 7 wherein the ratio of weight average particle size diameter to number average particle size diameter expressed as $D_w/D_n$ is greater than 3.5.

* * * * *